US009563109B2

(12) United States Patent
Matsubara et al.

(10) Patent No.: US 9,563,109 B2
(45) Date of Patent: Feb. 7, 2017

(54) LIGHT SOURCE DEVICE WITH WAVELENGTH CONVERSION ELEMENT AND PROJECTOR INCLUDING THE SAME

(71) Applicant: SEIKO EPSON CORPORATION, Tokyo (JP)

(72) Inventors: Takayuki Matsubara, Chino (JP); Hidefumi Sakata, Tatsuno-machi (JP)

(73) Assignee: SEIKO EPSON CORPORATION, Tokyo (JP)

(*) Notice: Subject to any disclaimer, the term of this patent is extended or adjusted under 35 U.S.C. 154(b) by 99 days.

(21) Appl. No.: 14/093,239

(22) Filed: Nov. 29, 2013

(65) Prior Publication Data

US 2014/0168614 A1    Jun. 19, 2014

(30) Foreign Application Priority Data

Dec. 13, 2012    (JP) ................. 2012-272040

(51) Int. Cl.
| G03B 21/20 | (2006.01) |
| G02B 27/14 | (2006.01) |
| H04N 9/31 | (2006.01) |

(52) U.S. Cl.
CPC .......... *G03B 21/204* (2013.01); *G02B 27/141* (2013.01); *H04N 9/3105* (2013.01); *H04N 9/3114* (2013.01); *H04N 9/3158* (2013.01); *H04N 9/3164* (2013.01); *H04N 9/3111* (2013.01); *H04N 9/3117* (2013.01)

(58) Field of Classification Search
CPC ... G03B 21/204; H04N 9/3111; H04N 9/3114; H04N 9/3117
See application file for complete search history.

(56) References Cited

U.S. PATENT DOCUMENTS

| 7,070,300 | B2 |   | 7/2006 | Harbers et al. | |
| 8,287,132 | B2 | * | 10/2012 | Miyamae et al. | 353/31 |
| 8,602,562 | B2 | * | 12/2013 | Miyamae | 353/20 |
| 8,678,596 | B2 | * | 3/2014 | Sakata et al. | 353/31 |
| 2011/0043761 | A1 | * | 2/2011 | Miyamae | 353/20 |
| 2011/0043762 | A1 | * | 2/2011 | Miyamae et al. | 353/20 |
| 2011/0228232 | A1 | * | 9/2011 | Sakata et al. | 353/31 |
| 2011/0292349 | A1 | * | 12/2011 | Kitano et al. | 353/31 |
| 2012/0002173 | A1 | * | 1/2012 | Akiyama | 353/30 |
| 2012/0019786 | A1 | * | 1/2012 | Kimura | 353/31 |
| 2012/0026469 | A1 | * | 2/2012 | Akiyama | G02B 27/142 353/20 |
| 2012/0133904 | A1 | * | 5/2012 | Akiyama | G02B 27/102 353/38 |
| 2014/0152964 | A1 | * | 6/2014 | Sakata et al. | 353/31 |

FOREIGN PATENT DOCUMENTS

| JP | A-2005-347263 | 12/2005 |
| JP | 2008-268639 A | 11/2008 |

* cited by examiner

*Primary Examiner* — Bao-Luan Le
(74) *Attorney, Agent, or Firm* — Oliff PLC

(57) ABSTRACT

A light source device includes a wavelength conversion element adapted to emit a second light in a first wavelength range due to irradiation of a first light, and a wavelength separation element to which the second light is input, and the wavelength separation element generates a third light reduced in light intensity of a component in a second wavelength range among a component in the first wavelength range compared to the second light.

21 Claims, 11 Drawing Sheets

LIGHT SOURCE DEVICE WITH WAVELENGTH CONVERSION ELEMENT AND PROJECTOR INCLUDING THE SAME

BACKGROUND

1. Technical Field

The present invention relates to a light source device adapted to perform wavelength conversion of light, and a projector using the light source device.

2. Related Art

As an illumination device applicable to a projector or the like, there has been known an illumination device for performing the wavelength conversion on the light from a high-intensity light source including a semiconductor light emitting device using a wavelength conversion element (see JP-A-2005-347263 (Document 1)). In the illumination device, the wavelength conversion element is physically separated from the light source to thereby make it possible to obtain high intensity.

However, in the case of using the illumination device of Document 1 for a light source of an image display device such as a projector, the source light thus generated is not necessarily good in color separation property, and in the case in which the color separation property of the source light is not good, there is a possibility that the color reproducibility is degraded to make the quality of the image to be formed inferior.

SUMMARY

An advantage of some aspects of the invention is to provide a light source device for generating the source light high in intensity and capable of achieving high color reproducibility. Another advantage of some aspects of the invention is to provide a projector capable of forming an image high in color reproducibility using the light source device.

An aspect of the invention is directed to a light source device including a light source adapted to emit a first light, a wavelength conversion element adapted to emit a second light in a first wavelength range due to irradiation of the first light, and a wavelength separation element to which the second light is input, and the wavelength separation element generates a third light reduced in a light intensity of a component in a second wavelength range among a component in the first wavelength range compared to the second light.

According to the light source device described above, the wavelength separation element generates the third light reduced in light intensity of the component in the second wavelength range among the component in the first wavelength range compared to the second light. Thus, it is possible to take out the third light, which has a high color separation property, and is reduced in light intensity of the component in the wavelength range degrading the color separation property when, for example, separating the second light into a plurality of primary colors. As a result, in the case of using the light source device for the image display device such as a projector, high color reproducibility can be achieved.

According to a specific aspect of the invention, the second wavelength range includes a fifth wavelength range, which is a wavelength range between a third wavelength range on a long wavelength side and a fourth wavelength range on a short wavelength side among the first wavelength range. In this case, the light intensity in the fifth wavelength range among the second light can be reduced using the wavelength separation element. Thus, there can be generated the third light with a high color separation property having a peak in each of the two wavelength ranges, namely the third wavelength range on the long wavelength side and the fourth wavelength range on the short wavelength side.

According to another specific aspect of the invention, the third wavelength range is a wavelength range of a red light component, and a fourth wavelength range is a wavelength range of a green light component. In this case, the light high in color separation property with respect to the red light component and the green light component using the wavelength separation element is generated.

According to still another specific aspect of the invention, the second wavelength range further includes a sixth wavelength range, which includes a wavelength range of the first light and is located on the short wavelength side of the fourth wavelength range. In this case, it is possible to, for example, change the light path direction by reflecting the first light from the light source, or separate the component in the wavelength range to eliminate the component from the light path using the wavelength separation element.

According to yet another specific aspect of the invention, the wavelength separation element generates the third light by reflecting a component of the second light other than the component in the second wavelength range. In this case, the light reflected by the wavelength separation element can be used as the third light.

According to still yet another specific aspect of the invention, the wavelength separation element generates the third light by transmitting a component of the second light other than the component in the second wavelength range. In this case, the light passing through the wavelength separation element can be used as the third light.

According to further another specific aspect of the invention, the wavelength separation element reflects the first light, which is emitted by the light source, toward the wavelength conversion element, and reflects the component in the second wavelength range among the second light toward the light source. In this case, it is possible to change the light path direction of the first light from the light source to make the first light enter the wavelength conversion element using the reflection in the wavelength separation element. Further, it is possible to eliminate the component in the second wavelength range from the second light using the reflection in the wavelength separation element.

According to still further another specific aspect of the invention, the component in the second wavelength range is excluded from the third light. In this case, the third light having an extremely high color separation property can be generated.

According to yet further another specific aspect of the invention, among the second wavelength range, the fifth wavelength range is 570 nm through 600 nm, and the sixth wavelength range is 430 nm through 500 nm. In this case, the fifth wavelength range is the wavelength range located between the red light component and the green light component, and the sixth wavelength range is the wavelength range of the blue light, and by separating the component of these wavelength ranges and eliminating the component from the light path, the third light with a high color separation property can be generated.

According to still yet further another specific aspect of the invention, the light source is one of a solid-state light source, a xenon lamp, and a mercury lamp. In this case, the light source device can be provided with sufficient luminance for the light source device used for the projector and so on.

Another aspect of the invention is directed to a projector including any of the light source devices described above, a light modulation device adapted to modulate the light from the light source device in accordance with image information, and a projection optical system adapted to project the modulated light from the light modulation device as a projection image. In this case, by using the light source device described above, it becomes possible to form an image high in color reproducibility and quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be explained in detail with reference to the accompanying drawings.

Figure 1A:
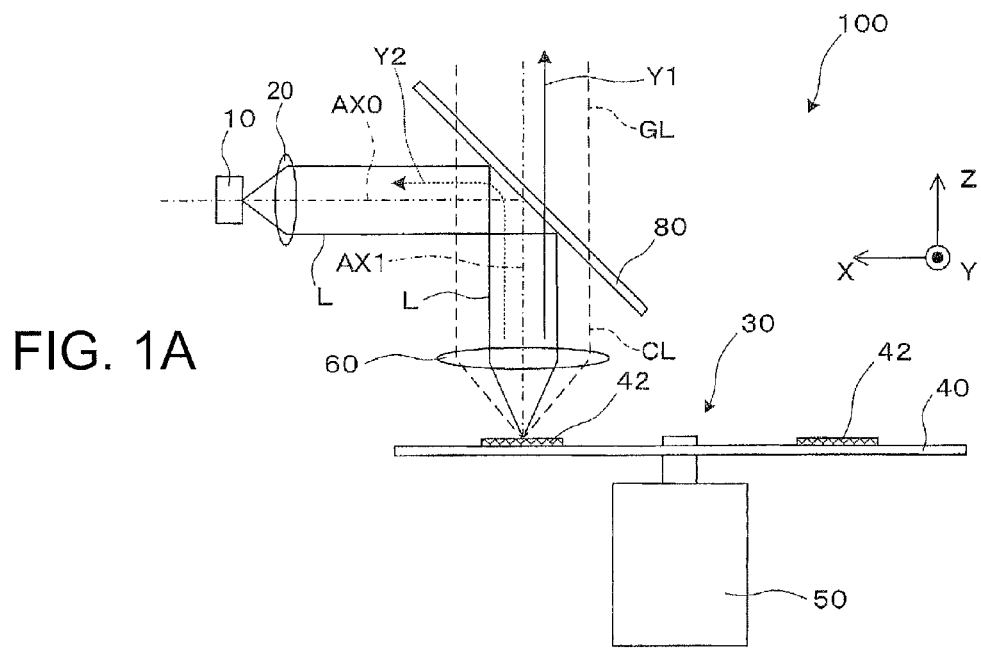
FIG. 1A is a diagram for explaining an optical system of a light source device according to a first embodiment.
Figure 1B:
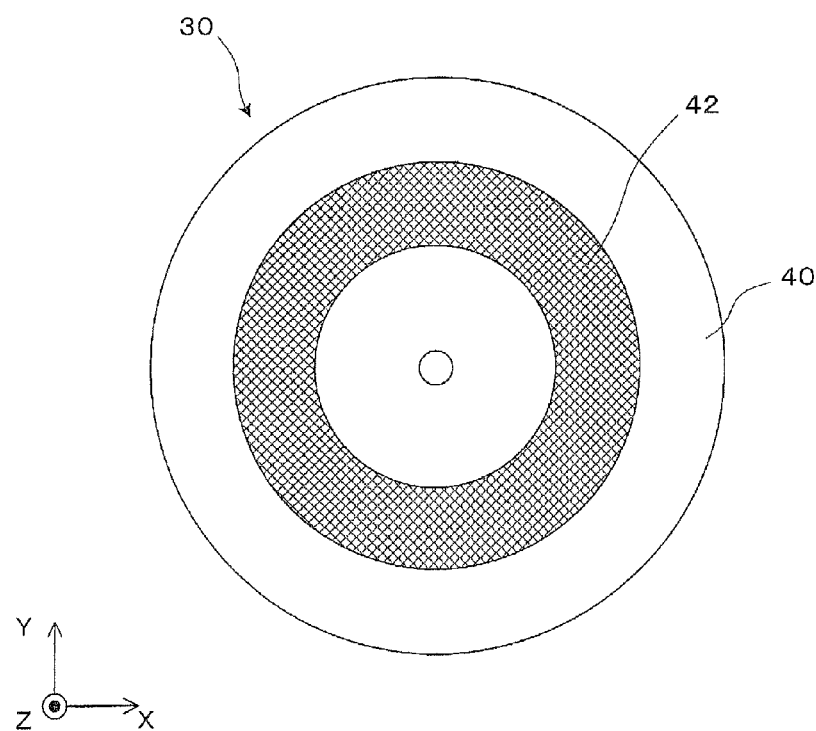
FIG. 1B is a diagram for explaining a rotary fluorescent plate.

The light source device 100 shown in FIG. 1A is provided with a phosphor 42 as a wavelength conversion element, a light source 10, a collimating lens 20 as a collimating optical system, a rotary fluorescent plate 30 as a rotating plate for rotatably holding the wavelength conversion element, an electric motor 50, a pickup lens 60, which is a light collection optical system and at the same time functions a collimating optical system, and a wavelength separation element 80. It should be noted that as shown in FIG. 1B, the rotary fluorescent plate 30 has a disk-like shape.

The light source 10 is a laser source for emitting a blue laser beam L as a first light. The laser beam L has a light emission intensity peak at, for example, about 455 nm, and a wavelength band of 430 through 470 nm as a principal component. The phosphor 42 converts the first light into a second light. As described later, the wavelength separation element 80 generates source light, which is a third light, from the second light.

The collimating lens 20 is a collimating optical system disposed in the light path from the light source 10 to the wavelength separation element 80, and suppresses the divergence of the laser beam L emitted from the light source 10 to roughly collimate the laser beam L.

Figure 2:
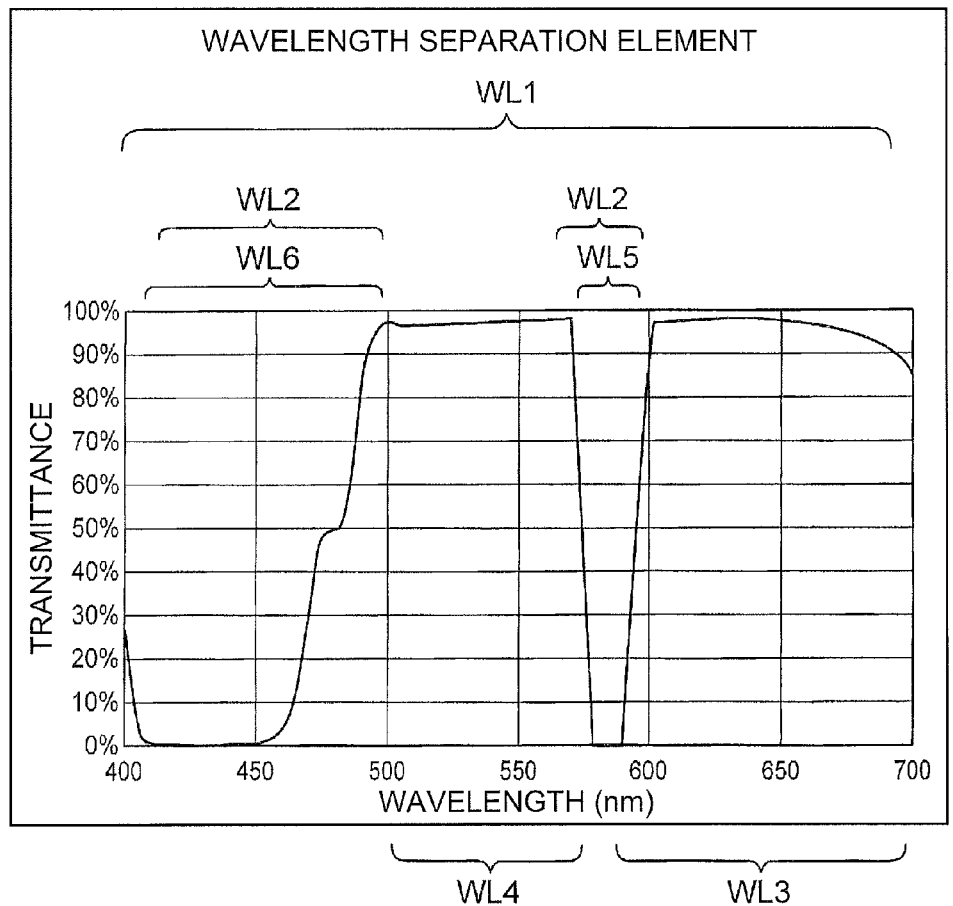
FIG. 2 is a graph showing the transmission characteristics of a wavelength separation element.

As shown in the drawing, the wavelength separation element 80 is disposed in the light path from the collimating lens 20 to the rotary fluorescent plate 30. The wavelength separation element 80 is disposed so as to intersect with each of the optical axis AX0 of the light source 10 and the optical axis AX1 of the light source device 100 perpendicular to the optical axis AX0 at an angle of 45°, and reflects the laser beam L, which is input from the collimating lens 20, toward the rotary fluorescent plate 30. Although described later in detail, the wavelength separation element 80 has such transmission characteristics depending on the wavelength as shown in the graph of FIG. 2, and reflects most of the light component in a range of 430 through 470 nm, which is the wavelength range of the laser beam L. In other words, a most part of the principal component of the laser beam L having passed through the collimating lens 20 is reflected by the wavelength separation element 80, and then proceeds toward the rotary fluorescent plate 30.

The pickup lens 60 is disposed in the light path between the rotary fluorescent plate 30 and the wavelength separation element 80, and makes the laser beam L reflected by the wavelength separation element 80 enter the phosphor 42 in a roughly converged state. In other words, the pickup lens 60 functions as the collection optical system for collecting the laser beam L as the first light, and also functions as the collimating optical system with respect to the second light emitted from the phosphor 42 as described later.

The rotary florescent plate 30 is a so-called reflective rotary fluorescent plate. As shown in FIG. 1A 1B, the rotary fluorescent plate 30 is obtained by continuously forming a single phosphor 42 on a plate member 40, which can be rotated by the electric motor 50, along a rotational direction of the plate member 40. An area provided with the phosphor 42 includes an area which the laser beam L as the excitation light (the blue light) enters. The rotary fluorescent plate 30 emits composite light CL as the second light including red light and green light toward the same side as the side which the laser beam L enters.

The rotary fluorescent plate 30 rotates at 7,500 rpm in use. Although the detailed explanation will be omitted, the rotary fluorescent plate 30 has a diameter of, for example, 50 mm, and is configured so that the optical axis of the excitation light entering the rotary fluorescent plate 30 is located at the position approximately 22.5 mm distant from the rotational center of the rotary fluorescent plate 30. In other words, the rotary fluorescent plate 30 rotates at a rotational speed at which the focused spot of the excitation light moves on the phosphor 42 at about 18 m/sec.

The phosphor 42 converts, for example, a part of the laser beam L (the blue light) as the excitation light emitted from the light source 10 into light including the red light and the green light. In other words, the phosphor 42 is a wavelength conversion element for converting the laser beam L as the first light into the composite light CL as the second light including components in other wavelength ranges. Specifically, the phosphor 42 is efficiently excited by the excitation light having a wavelength of 455 nm, and converts the part of the excitation light emitted by the light source 10 into yellow fluorescence including the red light and the green light, and then emits the yellow fluorescence. Among the yellow fluorescence, the component on the long wavelength side is used as the red light, and among the yellow fluorescence, the component on the short wavelength side is used as the green light. It should be noted that the composite light CL emitted from the phosphor 42 includes the component, which has failed to be converted in to the fluorescence in the phosphor 42 among the laser beam L.

The phosphor 42 is formed of a layer including, for example, $(Y, Gd)_3 (Al, Ga)_5O_{12}$:Ce as a YAG phosphor. As the phosphor 42, a layer including other phosphors for emitting fluorescence including the red light and the green light can also be used. Further, as the phosphor 42, a layer including a mixture of a phosphor for converting the excitation light (the blue light) into the red light and a phosphor for converting the excitation light (the blue light) into the green light can also be used.

The plate member 40 for supporting the phosphor 42 can be made of a transparent material for transmitting the excitation light, such as quartz glass, quartz crystal, sapphire, optical glass, or transparent resin, or can be made of an opaque material, which does not transmit the excitation light, such as metal. Further, it is also possible to adopt a configuration of disposing a dichroic film formed of, for example, a dielectric multilayer film between the phosphor 42 and the plate member 40 to reflect the component, which is a part of the light radiated from the phosphor 42, and proceeds toward the plate member 40, toward the wavelength separation element 80 to thereby improve the light efficiency.

The pickup lens 60 suppresses the divergence of the composite light CL, which is the second light emitted from the phosphor 42 of the rotary fluorescent plate 30 to thereby roughly collimate the composite light CL. In other words, the pickup lens 60 functions as a collimating optical system for collimating the composite light CL, which is the light from the rotary fluorescent plate 30.

The composite light CL, which has been emitted from the phosphor 42 and then transmitted through the pickup lens 60, enters the wavelength separation element 80. The wavelength separation element 80 reduces the intensity of the light with a partial wavelength component among the composite light CL (the second light) to thereby generate the source light GL (the third light). Specifically, compared to the composite light CL, the source light GL is reduced in the intensity of the light with a component in a second wavelength range, which is a specific part of a first wavelength range corresponding to the wavelength range of the composite light CL. Thus, in the case of using the light source device 100 as a part of the light source device in, for example, a projector, high color reproducibility can be obtained.

Preferably, the source light GL does not include the light with the component in the second wavelength range among the component in the first wavelength range. Thus, higher color reproducibility can be obtained. In the present embodiment, the wavelength separation element 80 transmits only the useful component Y1 with a high color separation property among the composite light CL on the one hand, and reflects the other, useless component Y2 toward the light source on the other hand, to thereby eliminate the useless component Y2 from the composite light CL. The useless component Y2 corresponds to the component in the second wavelength range.

Hereinafter, the wavelength separation element 80 will be explained in detail. Here, as shown in FIG. 2, the wavelength range equal to or longer than 400 nm and equal to or shorter than 700 nm is defined as a first wavelength range WL1. Out of the range included in the first wavelength range WL1, the wavelength range equal to or longer than 430 nm and shorter than 500 nm, and the wavelength range equal to or longer than 570 nm and shorter than 600 nm are defined as the second wavelength range WL2. Out of the second wavelength range WL2, the range equal to or longer than 570 nm and shorter than 600 nm is defined as a fifth wavelength range WL5, and the range equal to or longer than 430 nm and shorter than 500 nm is defined as a sixth wavelength range WL6. Further, the range equal to or longer than 500 nm and shorter than 570 nm is defined as a fourth wavelength range WL4, and the wavelength range equal to or longer than 600 nm and shorter than 700 nm is defined as a third wavelength range WL3.

As shown in FIG. 2, the wavelength separation element 80 reflects the light included in the second wavelength range WL2 among the first wavelength range WL1, and transmits the light in other ranges. In other words, in the wavelength separation element 80, the reflectance of the component in the second wavelength range WL2 is set to be higher than the reflectance of the component in the wavelength ranges other than the second wavelength range WL2 among the first wavelength range WL1. The wavelength range of the principal component of the laser beam L is 430 through 470 nm, and therefore, the laser beam L is reflected by the wavelength separation element 80.

The third wavelength range WL3 is the wavelength range of the light useful as the red light component, and the fourth wavelength range WL4 is set to the wavelength range of the light useful as the green light. In contrast thereto, the fifth wavelength range WL5, which is the wavelength range between the third wavelength range WL3 and the fourth wavelength range WL4, corresponds to the component of the wavelength range degrading the color separation property between the red light and the green light. In other words, if the light emitted from the light source device 100 includes the light in the fifth wavelength range WL5, the color reproducibility is degraded in the case of using the light source device 100 as a part of the light source device in, for example, a projector.

Therefore, in the light source device 100, the wavelength separation element 80 emits the components in the third wavelength range WL3 and the fourth wavelength range WL4 as the useful component Y1 on the one hand, and eliminates the component in the fifth wavelength range WL5 as the useless component Y2 from the composite light CL, which is the second light. In such a manner as described above, the light source device 100 generates the source light GL having a preferable color separation property between the red light and the green light, and high color reproducibility.

Further, the wavelength separation element 80 also eliminates the component in the sixth wavelength range WL6 including the principal component of the laser beam L as the useless component Y2 from the composite light CL. Therefore, the source light GL with higher color reproducibility can be generated.

Figure 3A:
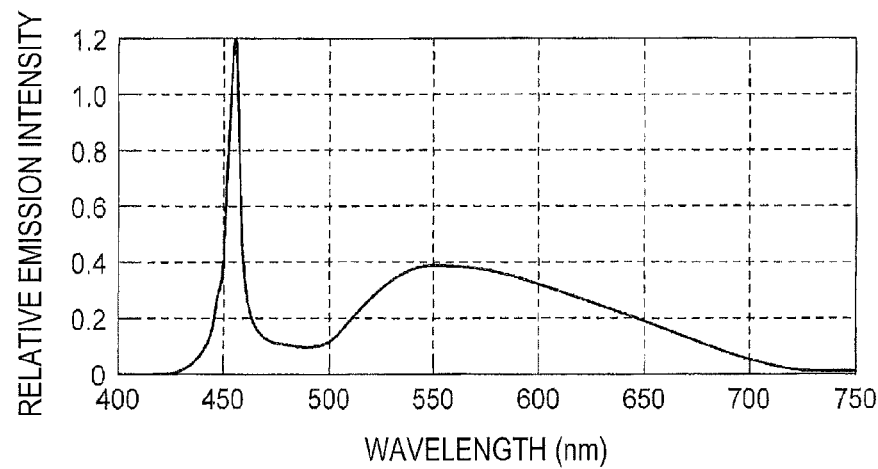
FIG. 3A is a graph showing the emission spectrum of a phosphor.
Figure 3B:
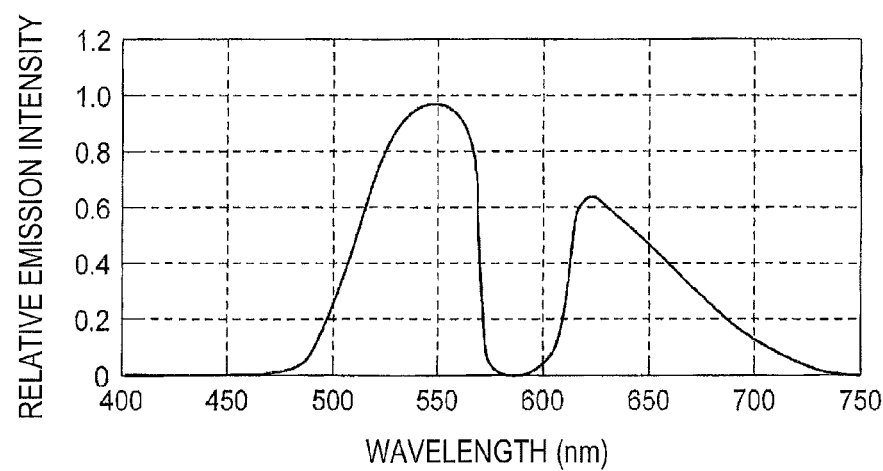
FIG. 3B is a graph showing the emission spectrum of the wavelength separation element.

The wavelength separation element 80 has a reflective property with respect to the laser beam L. Therefore, the wavelength separation element 80 emits a large part of the component of the laser beam L, which has been emitted from the light source 10, toward the phosphor 42 of the rotary fluorescent plate 30. A part of the laser beam L as the first light is converted into the composite light CL as the second light in the phosphor 42. The graph shown in FIG. 3A shows the emission spectrum of the light obtained by converting the laser beam L as the excitation light in the rotary fluorescent plate 30, namely the emission spectrum of the composite light CL. As shown in the drawing, the component in the wavelength range of the blue light (the excitation light) remaining without being converted by the phosphor 42 and the yellow fluorescence component including the red light wavelength range and the green light wavelength range generated by the conversion in the phosphor 42 in a mixed manner are included in the composite light CL in a mixed manner. In contrast thereto, as described above, the wavelength separation element 80 has a property of reflecting the light in the second wavelength range WL2. Therefore, among the component of the composite light CL proceeding toward the wavelength separation element 80, the component in the fifth wavelength range WL5 and the component in the sixth wavelength range WL6 are cut in the wavelength separation element 80, and it results that the yellow light having the wavelength characteristics shown in the graph of FIG. 3B is emitted as the source light GL. Thus, in the case of using the light source device 100 as a part of the light source device in, for example, a projector, since the preferable color separation property with respect to the red light and the green light is obtained, the high color reproducibility can be obtained.

Figure 4:
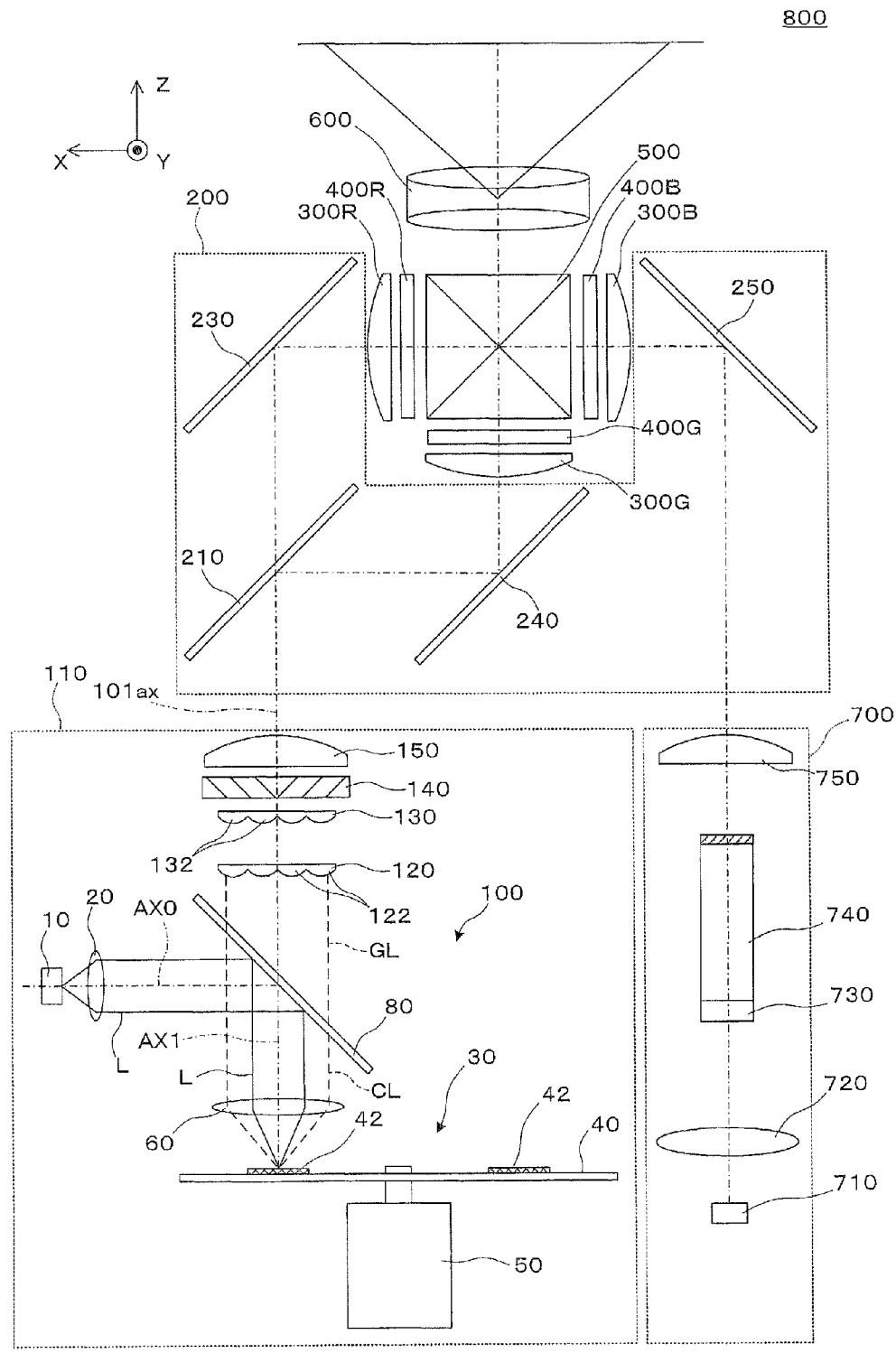
FIG. 4 is a diagram for explaining an example of a projector equipped with the light source device.

FIG. 4 is a diagram showing an example of a projector equipped with the light source device 100. The projector 800 shown in FIG. 4 is provided with two illumination devices, namely a first illumination device 110 including the light source device 100, and a second illumination device 700. The first illumination device 110 is provided with a first lens array 120, a second lens array 130, a polarization conversion element 140, and an overlapping lens 150, besides the light source device 100 described above. Further, the projector 800 is provided with a color separation light guide optical system 200, liquid crystal light modulation devices 400R, 400G, and 400B as a light modulation device, a cross dichroic prism 500, and a projection optical system 600. Further, collecting lenses 300R, 300G, and 300B are disposed between the color separation light guide optical system 200 and the liquid crystal light modulation devices 400R, 400G, and 400B, respectively.

One of the two illumination devices, namely the first illumination device 110, uses the source light GL emitted from the light source device 100 to generate the illumination light for illuminating the liquid crystal light modulation devices 400R, 400G among the three light modulation devices described above.

The first lens array 120 has a plurality of first small lenses 122 for dividing the light from the light source device 100 into a plurality of partial light beams. The first lens array 120 functions as a light beam dividing optical element for dividing the light emitted from the light source device 100 into a plurality of partial light beams. The first lens array 120 has a configuration of arranging the plurality of first small lenses 122 in a plane perpendicular to the illumination light axis 101ax of the first illumination device 110, which is an axis on the extension of the optical axis AX1, in a matrix with a plurality of rows and a plurality of columns. Although the explanation with a graphical description will be omitted, an outer shape of the first small lens 122 is roughly similar to an outer shape of each of the image forming areas of the respective liquid crystal light modulation devices 400R, 400G, and 400B.

The second lens array 130 has a plurality of second small lenses 132 corresponding to the plurality of first small lenses 122 of the first lens array 120. The second lens array 130 has a function of imaging the image of each of the first small lenses 122 of the first lens array 120 in the vicinity of the image forming area of each of the liquid crystal light modulation devices 400R, 400G in cooperation with the overlapping lens 150. The second lens array 130 has a configuration of arranging the plurality of second small lenses 132 in a plane perpendicular to the illumination light axis 101ax in a matrix with a plurality of rows and a plurality of columns.

The polarization conversion element 140 is an optical element for converting the partial light beams, which are obtained by the dividing operation by the first lens array 120, into substantially single linearly-polarized light with a uniform polarization direction, and then emits the light thus obtained. The polarization conversion element 140 has a polarization split layer for transmitting one linearly-polarized component among the polarization components included in the light from the light source device 100 without modification while reflecting the other linearly-polarized component in a direction perpendicular to the illumination light axis 101ax, a reflecting layer for reflecting the other linearly-polarized component, which has been reflected by the polarization split layer, in a direction parallel to the illumination light axis 101ax, and a wave plate for converting the other linearly-polarized component having been reflected by the reflecting layer into the one linearly-polarized component.

The overlapping lens 150 is an optical element for collecting each of the partial light beams from the polarization conversion element 140 to thereby overlap the partial light beams in the vicinity of the image forming area of each of the liquid crystal light modulation devices 400R, 400G. The overlapping lens 150 is disposed so that the optical axis of the overlapping lens 150 and the optical axis of the light source device 100 roughly coincide with each other. The overlapping lens 150 can also be formed of a compound lens having a plurality of lenses combined with each other. The first lens array 120, the second lens array 130, and the overlapping lens 150 constitute an integrator optical system for homogenizing the in-plane light intensity distribution of the light from the light source device 100.

It should be noted that a rod integrator optical system using a rod lens can also be used instead of the lens integrator optical system using the first lens array 120 and the second lens array 130.

The other of the two illumination devices, namely the second illumination device 700, is provided with a second light source 710, a light collection optical system 720, a scattering plate 730, a polarization conversion integrator rod 740, and a collecting lens 750, and generates the illumination light for illuminating the liquid crystal light modulation device 400B among the three light modulation devices described above.

The second light source 710 is a laser source for emitting the blue light (having a peak emission intensity at a wavelength of about 445 nm) consisting of a laser beam as the colored light. It should be noted that although FIG. 4 shows the single light source 710, the number of the light sources 710 is not limited to one, but it is also possible to provide a plurality of second light sources 710. Further, it is also possible to use a light source device for emitting the blue light having a wavelength (e.g., 460 nm) other than 445 nm.

The light collection optical system 720 is formed of, for example, a convex lens, and makes the blue light enter the scattering plate 730 in a roughly converged state.

The scattering plate 730 scatters the blue light beam from the second light source 710 at a predetermined scattering intensity to thereby obtain the blue light having the light distribution similar to that of the red light and the green light emitted from the phosphor 42 of the rotary fluorescent plate 30. As the scattering plate 730, obscure glass made of optical glass, for example, can be used.

The polarization conversion integrator rod 740 is an optical element for homogenizing the in-plane light intensity distribution of the blue light from the second light source 710, and converting the blue light into substantially single linearly-polarized light with a uniform polarization direction. Although the detailed explanation is omitted, the polarization conversion integrator rod 740 is provided with an integrator rod, a reflecting plate disposed on the entrance surface side of the integrator rod and having a small hole through which the blue light is input, and a reflective polarization plate disposed on the exit surface side.

It should be noted that a lens integrator optical system using a lens array and a polarization conversion element can also be used instead of the polarization conversion integrator rod using the rod lens.

The collecting lens 750 collects the light from the polarization conversion integrator rod 740, and then makes the light enter the vicinity of the image forming area of the liquid crystal light modulation device 400B.

The color separation light guide optical system 200 is provided with a dichroic mirror 210, and reflecting mirrors 230, 240, and 250. The color separation light guide optical system 200 has a function of separating the light from the first illumination device 110 into the red light and the green light, and respectively guiding the colored lights of the red light and the green light from the first illumination device 110 and the blue light from the second illumination device 700 to the liquid crystal light modulation devices 400R, 400G, and 400B to be the illumination target. It should be noted that as described above, the collecting lenses 300R, 300G, and 300B are disposed between the color separation light guide optical system 200 and the liquid crystal light modulation devices 400R, 400G, and 400B, respectively.

The dichroic mirror 210 is a mirror having a wavelength selecting transmissive film formed on a substrate, which reflects the light in a predetermined wavelength band and transmits the light in another wavelength band. Here, the dichroic mirror 210 is assumed to transmit the red light component and reflect the green light component and the blue light component. The red light having passed through the dichroic mirror 210 is reflected by the reflecting mirror 230, and then enters the image forming area of the liquid crystal light modulation device 400R for the red light after passing through the collecting lens 300R. The green light having been reflected by the dichroic mirror 210 is further reflected by the reflecting mirror 240, and then enters the image forming area of the liquid crystal light modulation device 400G for the green light after passing through the collecting lens 300G. The blue light from the second illumination device 700 is reflected by the reflecting mirror 250, and then enters the image forming area of the liquid crystal light modulation device 400B for the blue light after passing through the collecting lens 300B.

The liquid crystal light modulation devices 400R, 400G, and 400B modulate the respective colored lights having been input thereto in accordance with the image information to thereby form a color image. The liquid crystal light modulation devices 400R, 400G, and 400B are the illumination target of the light source device 100. Although omitted from the drawings, an entrance side polarization plate is disposed between each of the collecting lenses 300R, 300G, and 300B and corresponding one of the liquid crystal light modulation devices 400R, 400G, and 400B, and an exit side polarization plate is disposed between each of the liquid crystal light modulation devices 400R, 400G, and 400B and the cross dichroic prism 500. The light modulation of the respective colored lights having entered the entrance side polarization plates is performed by the entrance side polarization plates, the liquid crystal light modulation devices 400R, 400G, and 400B, and the exit side polarization plates described above, respectively.

The liquid crystal light modulation devices 400R, 400G, and 400B are each a transmissive liquid crystal light modulation device obtained by encapsulating a liquid crystal as an electrooptic material between a pair of transparent glass substrates. The liquid crystal light modulation devices 400R, 400G, and 400B are each provided with, for example, a polysilicon TFT as a switching element, and each modulate the polarization direction of the single linearly-polarized light emitted from the entrance side polarization plate in accordance with an image signal supplied.

The cross dichroic prism 500 is an optical element for combining the optical images modulated for respective colored lights emitted from the respective exit side polarization plates to thereby form a color image. The cross dichroic prism 500 has a roughly square shape in the plan view formed by bonding four rectangular prisms to each other. On the boundary surfaces having a roughly X shape on which the rectangular prisms are bonded to each other, there are formed dielectric multilayer films. The dielectric multilayer film formed on one of the boundary surfaces having the roughly X shape is a dielectric multilayer film for transmitting the green light and the blue light and reflecting the red light, and the dielectric multilayer film formed on the other of the boundary surfaces is a dielectric multilayer film for transmitting the red light and the green light and reflecting the blue light. The red light and the blue light are bent by the two types of dielectric multilayer films formed respectively on the boundary surfaces having the roughly X shape to have the proceeding direction aligned with the proceeding direction of the green light, thus the three colored lights are combined with each other.

The color image emitted from the cross dichroic prism 500 is projected in an enlarged manner by the projection optical system 600 to form an image on a screen.

Figure 5:
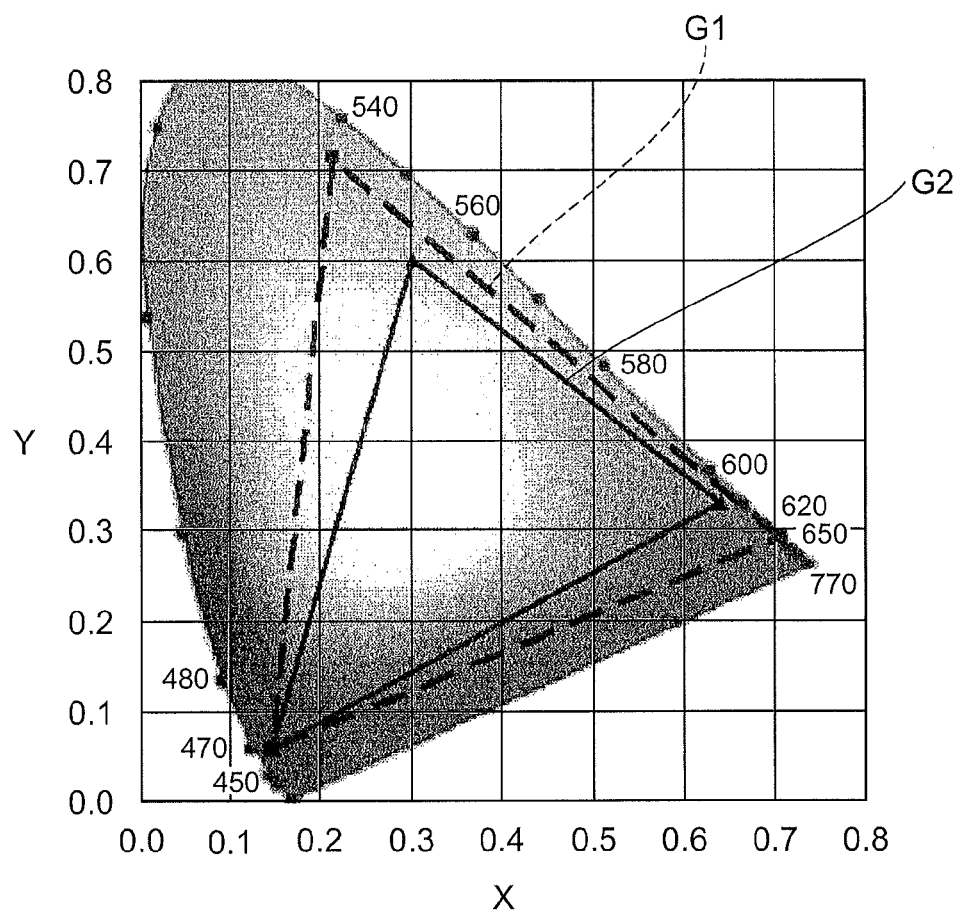
FIG. 5 is a diagram showing a chromaticity of light in the projector equipped with the light source device.

FIG. 5 is a diagram showing a chromaticity diagram showing the color reproducibility in the projector 800 using the illumination device 110. The graph G1 indicated by the dotted line in the drawing shows a color reproduction range in the present configuration. It should be noted that the graph G2 indicated by the solid line in the drawing as a comparative example shows the color reproduction range in the case in which the wavelength separation element 80 is not used in the present configuration. In comparison between the both cases, it is understood that the color reproducibility is improved in the present embodiment.

As described above, according to the projector 800 having the configuration described above, the phosphor 42 is excited by the excitation light emitted from the light source 10, and a plurality of colored lights is radiated. Therefore, it is possible to obtain the plurality of colored lights using the monochromatic light source 10. On this occasion, by cutting the component in the wavelength range between the red light and the green light in the wavelength separation element 80, the light source device 100 becomes to emit the light good in color separation property. Therefore, in the separation in the dichroic mirror 210, the lights with extremely high color reproducibility become to be taken out. Thus, the projector 800 can form the image with high image quality.

Further, in the configuration described above, since the phosphor 42 is formed on the plate member 40 rotated by the electric motor 50, the heat of the phosphor 42 generated by the irradiation of the excitation light is radiated in a large area along the rotational direction of the plate member 40. Therefore, the degradation of the luminous efficiency due to the heating of the phosphor 42 is suppressed, and thus, the brighter light source device 100 is provided.

Second Embodiment

Hereinafter, a light source device according to a second embodiment will be explained. It should be noted that the light source device according to the present embodiment is a modified example of the light source device 100 according to the first embodiment, and is roughly the same as the light source device 100 except the structure of apart including the light source through the anterior stage of the wavelength separation element, and therefore, the explanation of the overall device will be omitted.

Figure 6:
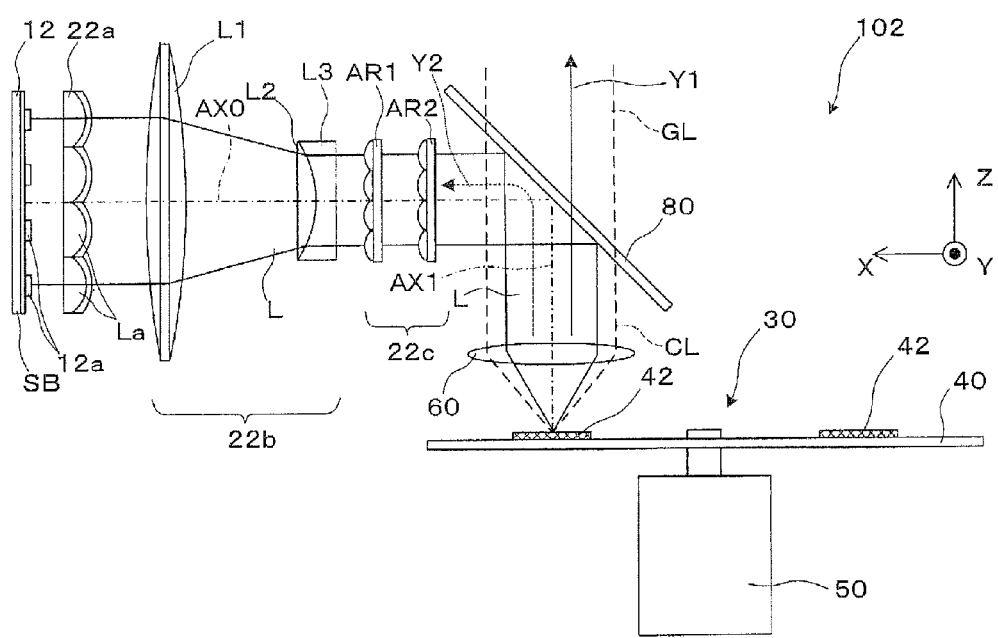
FIG. 6 is a diagram for explaining a light source device according to a second embodiment of the invention.

As shown in FIG. 6, the light source device 102 according to the present embodiment includes a light source 12 composed of a group of light sources, a collimating lens array 22a for roughly collimating the light from the light source 12, an afocal system 22b for regulating the beam cross-section of the light, and a lens array integrator 22c to thereby evenly illuminate the phosphor 42 with Kohler illumination.

The light source 12 is obtained by arranging a plurality of solid-state light source elements 12a, which are mounted on a substrate SB and each capable of emitting a laser beam, in a matrix.

The collimating lens array 22a is formed of a group of lens elements La corresponding respectively to the solid-state light source elements 12a constituting the light source 12, and roughly collimates the light from each of the solid-state light source elements 12a, and then emits the light toward the afocal system 22b.

The afocal system 22b is composed of a lens group having positive and negative lenses L1, L2, and L3 combined with each other, and regulates the beam cross-section of the incident light having been input in a collimated state, namely the size of the beam cross-section, while keeping the parallelism of the incident light. The excitation light having the beam cross-section regulated in the afocal system 22b enters the lens array integrator 22c.

The lens array integrator 22c is composed of a pair of lens arrays AR1, AR2, and divides the light having been input from the afocal system 22b, and then emits the light so as to overlap on the phosphor 42 as the irradiation target surface to thereby set the intensity distribution of the light to a homogenized state.

As described above, the collimating lens array 22a, the afocal system 22b, and the lens array integrator 22c function as a light regulation optical system for regulating the state of the laser beam from the light source 12 to thereby make the Kohler illumination possible.

In the case of the present embodiment, the laser beam L (the excitation light) having passed through the light source 12, the collimating lens array 22a, the afocal system 22b, and the lens array integrator 22c enters the phosphor 42 of the rotary fluorescent plate 30 after passing through the wavelength separation element 80 in a homogenized state. Since the intensity distribution of the laser beam L (the excitation light) as the first light, with which the phosphor 42 is irradiated, is homogenized, the homogenization of the intensity distribution of the fluorescence as the second light generated in the phosphor 42 can also be achieved.

Further, also in the present embodiment, the component in the wavelength range between the red light and the green light and the component in the wavelength range of the blue light are cut in the wavelength separation element 80, and in the case of using the light source device 102 as a part of the light source device in, for example, the projector, since the preferable color separation property with respect to the red light and the green light is provided, the high color reproducibility can be achieved.

Figure 7:
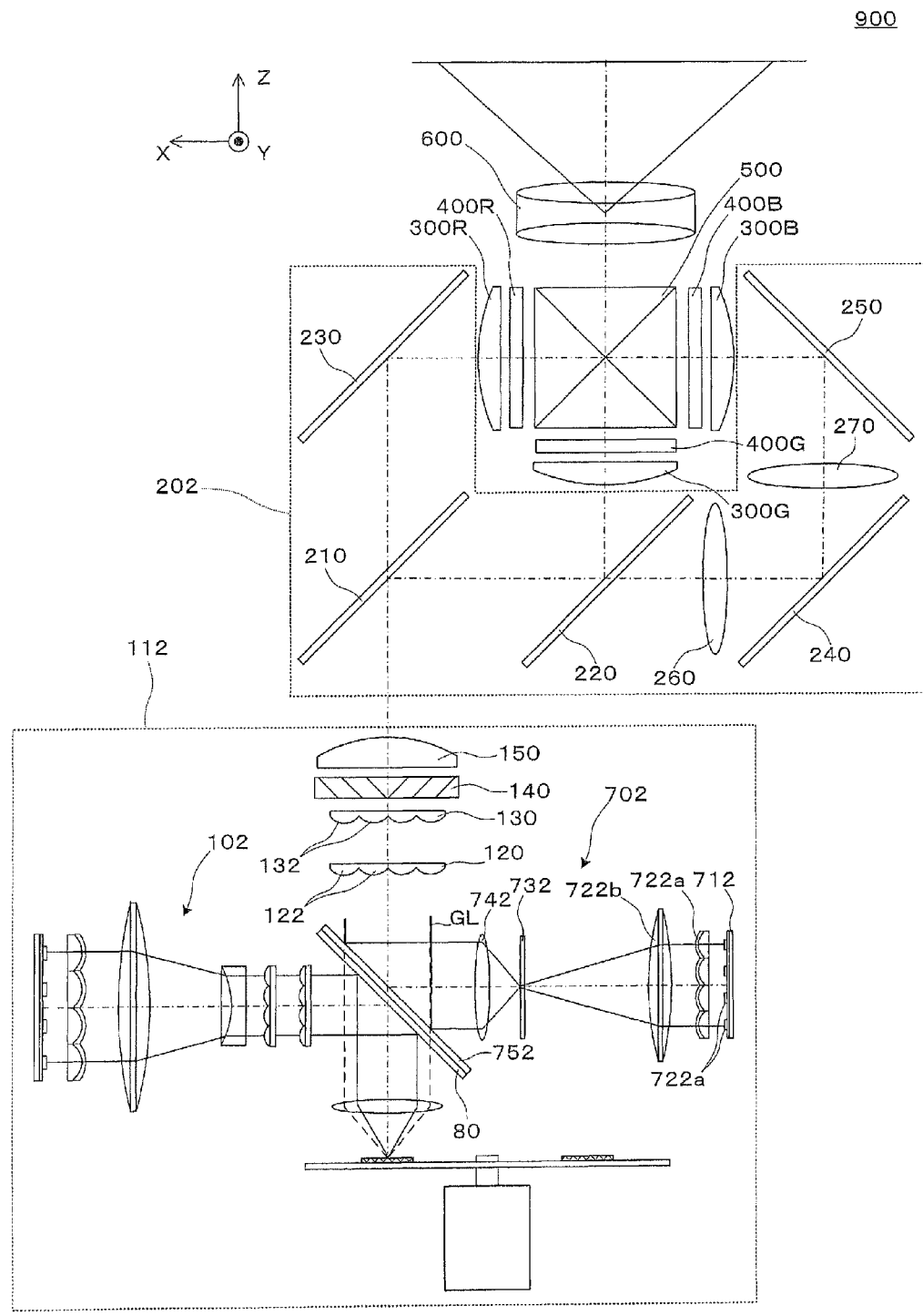
FIG. 7 is a diagram for explaining an example of a projector equipped with the light source device.

FIG. 7 is a diagram showing an example of a projector equipped with the light source device 102. The projector 900 shown in FIG. 7 has a configuration having two light source devices combined with each other in a single illumination device 112. More specifically, the illumination device 112 has the light source device 102 as a first light source device, and is further provided with a second light source device 702 in addition to the first light source device. It should be noted that the illumination device 112 is provided with the first lens array 120, the second lens array 130, the polarization conversion element 140, and the overlapping lens 150, besides the two light source devices described above. Further, the projector 900 is provided with a color separation light guide optical system 202, the liquid crystal light modulation devices 400R, 400G, and 400B as the light modulation device, the cross dichroic prism 500, and the projection optical system 600 besides the illumination device 112.

Among the two light source devices, the light source device 102 as the first light source device generates the illumination light for illuminating the liquid crystal light modulation devices 400R, 400G among the three light modulation devices, and the second light source device 702 generates the illumination light for illuminating the liquid crystal light modulation device 400B.

The second light source device 702 is provided with a second light source 712, a collimating lens array 722a, a light collection optical system 722b, a scattering plate 732, a collimating optical system 742, and a reflective combining element 752.

The second light source 712 is a laser source formed of a plurality of solid-state light source elements 712a arranged in a matrix, and for emitting the blue light (having a peak emission intensity at a wavelength of about 445 nm) consisting of a laser beam as the colored light.

The collimating lens array 722a is formed of a group of lens elements Lb corresponding respectively to the solid-state light source elements 712a constituting the second light source 712, and roughly collimates the light from each of the solid-state light source elements 712a, and then emits the light toward the light collection optical system 722b.

The light collection optical system 722b is formed of, for example, a convex lens, and makes the blue light enter the scattering plate 732 in a roughly converged state.

The scattering plate 732 scatters the blue light beam from the second light source 712 at a predetermined scattering intensity to thereby obtain the blue light having the light distribution similar to that of the red light and the green light emitted from the phosphor 42 of the rotary fluorescent plate 30. As the scattering plate 732, obscure glass made of optical glass, for example, can be used.

The collimating optical system 742 collimates the blue light from the scattering plate 732, and then emits the blue light toward the reflective combining element 752.

The reflective combining element 752 is a light reflecting element attached to a reverse side of the wavelength separation element 80, and reflecting light in the wavelength range of the blue light having passed through the collimating optical system 742, while transmitting the light in the wavelength range of the component having passed through the wavelength separation element 80 among the composite light CL from the phosphor 42. In other words, the reflective combining element 752 combines the component of the red light and the green light from the wavelength separation element 80 side and the component of the blue light from the collimating optical system 742 side with each other to thereby generate the source light GL including the three primary colors.

The source light GL generated in the reflective combining element 752 is emitted toward the color separation light guide optical system 202 as color illumination light after passing through the first lens array 120, the second lens array 130, the polarization conversion element 140, and the overlapping lens 150.

The color separation light guide optical system 202 is provided with the dichroic mirrors 210, 220, the reflecting mirrors 230, 240, and 250, and relay lenses 260, 270. The color separation light guide optical system 202 has a function of separating the light from the illumination device 112 into the red light, the green light, and the blue light, and respectively guiding the colored lights of the red light, the green light, and the blue light to the liquid crystal light modulation devices 400R, 400G, and 400B to be the illumination target. The collecting lenses 300R, 300G, and 300B are disposed between the color separation light guide optical system 202 and the liquid crystal light modulation devices 400R, 400G, and 400B, respectively.

The dichroic mirror 210 is a dichroic mirror for transmitting the red light component and reflecting the green light component and the blue light component. The dichroic mirror 220 is a dichroic mirror for reflecting the green light component and transmitting the blue light component. The reflecting mirror 230 is a mirror for reflecting the red light component. The reflecting mirrors 240, 250 are mirrors for reflecting the blue light component.

The red light having passed through the dichroic mirror 210 is reflected by the reflecting mirror 230, and then enters the image forming area of the liquid crystal light modulation device 400R for the red light after passing through the collecting lens 300R. The green light among the green light and the blue light having been reflected by the dichroic mirror 210 is further reflected by the dichroic mirror 220, and then enters the image forming area of the liquid crystal light modulation device 400G for the green light after passing through the collecting lens 300G. The blue light having passed through the dichroic mirror 220 enters the image forming area of the liquid crystal light modulation device 400B for the blue light via the relay lens 260, the reflecting mirror 240 on the entrance side, the relay lens 270, the reflecting mirror 250 on the exit side, and the collecting lens 300B. The relay lenses 260, 270 and the reflecting mirrors 240, 250 function as a relay optical system for guiding the blue light component, which has passed through the dichroic mirror 220, to the liquid crystal light modulation device 400B.

The liquid crystal light modulation devices 400R, 400G, and 400B modulate the respective colored lights having been input thereto in accordance with the image information to thereby form a color image.

As described above, according to the projector 900 having the configuration described above, since the illumination device 112 including the light source device 102 is arranged to emit the light with a preferable color separation property, an image with high image quality can be formed.

It should be noted that in the projector having the configuration described above, it is also possible to apply the light source device 100 described as the first embodiment instead of the light source device 102. Further, it is also possible to apply the light source device 102 to the projector 800 according to the first embodiment.

Third Embodiment

Hereinafter, a light source device according to a third embodiment will be explained. It should be noted that the light source device according to the present embodiment is a modified example of the light source device 100 according to the first embodiment, and is roughly the same as the light source device 100 except the point that the structure of a light transmissive wavelength conversion element is provided, and therefore, the explanation of the overall device will be omitted.

Figure 8A:
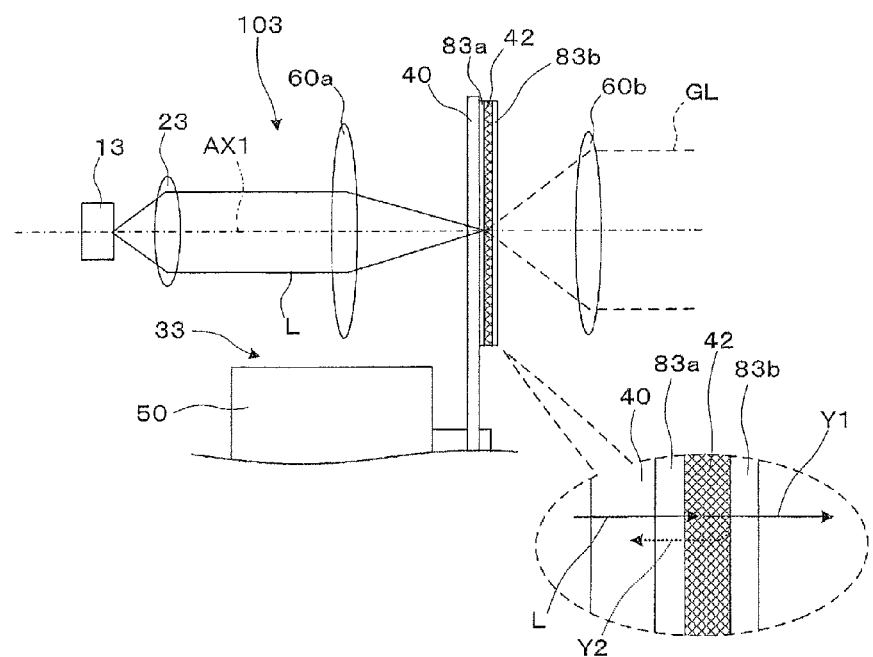
FIG. 8A is a diagram for explaining an example of a light source device according to a third embodiment of the invention.

As shown in FIG. 8A, a light source device 103 according to the present embodiment is provided with a light source 13, a collimating lens 23 as a collimating optical system, a light collection optical system 60a, a rotary fluorescent plate 33 as a rotating plate for rotatably holding the phosphor 42 as the wavelength conversion element, the electric motor 50, a pickup lens 60b as a collimating optical system, a first wavelength separation element 83a, and a second wavelength separation element 83b.

The light source 13 is a laser source for emitting the blue laser beam L, and the collimating lens 23 is a collimating optical system for suppressing the divergence of the laser beam L emitted from the light source 10 to thereby roughly collimate the laser beam L. The light collection optical system 60a makes the laser beam L, which has been collimated by the collimating lens 20, enter the rotary fluorescent plate 33 in the roughly converged state. In other words, the pickup lens 60 functions as the light collection optical system for collecting the laser beam L.

The rotary florescent plate 33 is a so-called transmissive rotary fluorescent plate. The rotary fluorescent plate 33 has the single phosphor 42 formed in a part of the plate member 40, which can be rotated by the electric motor 50, continuously along the rotational direction of the plate member 40.

The rotary fluorescent plate 33 rotates at 7,500 rpm in use. Although the detailed explanation will be omitted, the rotary fluorescent plate 33 has a diameter of, for example, 50 mm, and is configured so that the optical axis of the excitation light entering the rotary fluorescent plate 33 is located at the position approximately 22.5 mm distant from the rotational center of the rotary fluorescent plate 33. In other words, the rotary fluorescent plate 33 rotates at a rotational speed at which the focused spot of the excitation light moves on the phosphor 42 at about 18 m/sec.

The plate member 40 is made of a material transmitting the laser beam L as the excitation light. As the material of the plate member 40, there can be used, for example, quartz glass, quartz crystal, sapphire, optical glass, and transparent resin. The laser beam L having emitted from the light source device 100 enters the rotary fluorescent plate 33 as the excitation light from the plate member 40 side.

The phosphor 42 is a wavelength conversion element for converting a part of the laser beam L into the yellow fluorescence including the red light and the green light, and then emitting the fluorescence.

In the present embodiment, in particular, there is adopted the structure in which the phosphor 42 is sandwiched between the first wavelength separation element 83a and the second wavelength separation element 83b.

The first wavelength separation element 83a is located on the light path in an anterior stage of the phosphor 42. In other words, in the case shown in the drawing, the first wavelength separation element 83a is formed on the plate member 40 in the rotary fluorescent plate 33, and is disposed so as to be sandwiched between the plate member 40 and the phosphor 42. The first wavelength separation element 83a is a wavelength separation element having a property of transmitting a component in the wavelength range of the laser beam L as the first light on the one hand, and reflecting light in another wavelength range.

The second wavelength separation element 83b is located on the light path in a posterior stage of the phosphor 42. In other words, in the case shown in the drawing, the second wavelength separation element 83b is disposed on the phosphor 42 in the rotary fluorescent plate 33. The second wavelength separation element 83b is a wavelength separation element having a property of reflecting the component in the wavelength range of the laser beam L as the first light, and further reflecting a component in a range of 570 nm through 600 nm, which is the wavelength range located between the red light component and the green light component. In other words, the second wavelength separation element 83b is a wavelength separation element having substantially the same characteristics as the wavelength separation element 80 of the first embodiment.

Hereinafter, generation of the source light by the rotary fluorescent plate 33, the first wavelength separation element 83a, and the second wavelength separation element 83b will be explained. Firstly, as shown in FIG. 8A as a partially enlarged view, the laser beam L having passed through the plate member 40 of the rotary fluorescent plate 33 further passes through the first wavelength separation element 83a, and then enters the phosphor 42. The phosphor 42 functions as a wavelength conversion element, and converts apart of the laser beam L into the yellow fluorescence including the red light and the green light, and then emits the fluorescence. Then, the second wavelength separation element 83b transmits only a useful component Y1 with a high color separation property among the light emitted from the phosphor 42, and reflects the other, useless component Y2 so as to return to the light source side. It should be noted that the useless component Y2 passes through the first wavelength separation element 83a and then returns to the light source side, and is thus eliminated. In such a manner as described above, the light source device 103 eliminates the useless component Y2 from the composite light CL using the second wavelength separation element 83b, and can thus generate the yellow light high in color separation property as the source light GL.

Figure 8B:
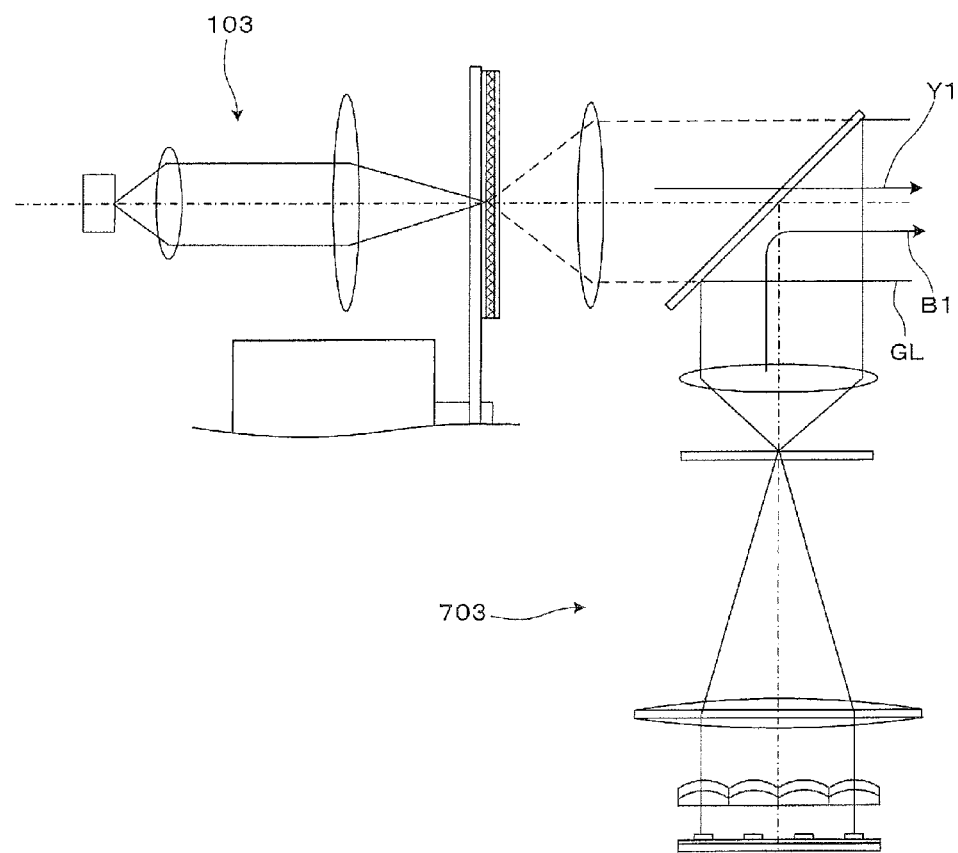
FIG. 8B is a diagram for explaining another example.

It should be noted that as shown in FIG. 8B, by combining the light source device 103 for emitting the yellow light as the useful component Y1 and the light source device 703 for emitting the blue light B1 with each other, the source light GL including the three primary colors can be generated. It should be noted that the structure of the light source device 703 can be made substantially the same as that of, for example, the light source device 702 shown in FIG. 7.

Fourth Embodiment

Hereinafter, a light source device according to a fourth embodiment will be explained. It should be noted that the light source device according to the present embodiment is a modified example of the light source device 103 according to the third embodiment, and is roughly the same as the light source device 103 except the structure of the wavelength separation element, and therefore, the explanation of the overall device will be omitted.

Figure 9A:
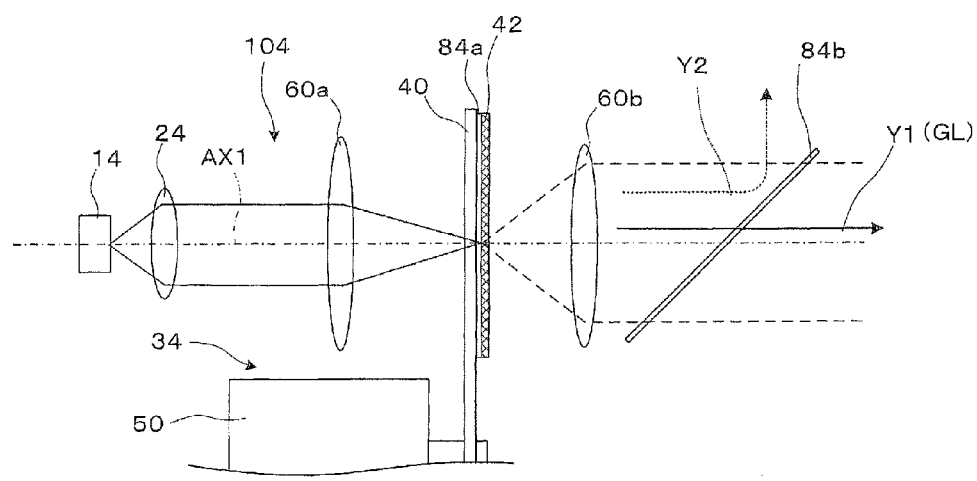
FIG. 9A is a diagram for explaining an example of a light source device according to a fourth embodiment of the invention.

As shown in FIG. 9A, a light source device 104 according to the present embodiment is provided with a light source 14, a collimating lens 24 as a collimating optical system, the light collection optical system 60a, a rotary fluorescent plate 34 as a rotating plate for rotatably holding the phosphor 42 as the wavelength conversion element, the electric motor 50, the pickup lens 60b as the collimating optical system, a first wavelength separation element 84a, and a second wavelength separation element 84b.

In the present embodiment, in particular, although the first wavelength separation element 84a is disposed so as to be sandwiched between the plate member 40 and the phosphor 42, the second wavelength separation element 84b is positioned on the light path in the posterior stage of the pickup lens 60b, and has an arrangement in which the optical surface thereof is tilted at an angle of 45° with the optical axis AX1 of the light source device 104.

It should be noted that the first wavelength separation element 84a is a wavelength separation element having a property of transmitting the component in the wavelength range of the laser beam L as the first light while reflecting the light in another wavelength range, and the second wavelength separation element 84b is a wavelength separation element having a property of reflecting the component in the wavelength range of the laser beam L as the first light, and further reflecting the component in the range of 570 nm through 600 nm as the wavelength range located between the red light component and the green light component.

Hereinafter, generation of the source light by the rotary fluorescent plate 34, the first wavelength separation element 84a, and the second wavelength separation element 84b will be explained. Firstly, the laser beam L having passed through the plate member 40 of the rotary fluorescent plate 34 further passes through the first wavelength separation element 84a, and then enters the phosphor 42. The phosphor 42 functions as a wavelength conversion element, and converts a part of the laser beam L into the yellow fluorescence including the red light and the green light, and then emits the fluorescence. The component, which has been emitted from the phosphor 42 and proceeded toward the pickup lens 60b, is collimated by the pickup lens 60b, and then proceeds toward the second wavelength separation element 84b. The second wavelength separation element 84b transmits only the useful component Y1 with a high color separation property among the light emitted from the phosphor 42, and reflects the other, useless component Y2. On this occasion, since the second wavelength separation element 84b is tilted at an angle of 45° with the optical axis AX1 of the light source device 104, the useless component Y2 proceeds toward a direction tilted at an angle of 90° with the light path direction, namely a direction out of the light path, instead of the light source side.

For example, by disposing a light absorptive material or the like ahead of the direction in which the useless component Y2 proceeds, the useless component Y2 can be treated so as not to be stray light or the like. In such a manner as described above, the light source device 104 eliminates the useless component Y2 from the composite light CL using the second wavelength separation element 84b, and can thus generate the yellow light high in color separation property as the source light GL.

Figure 9B:
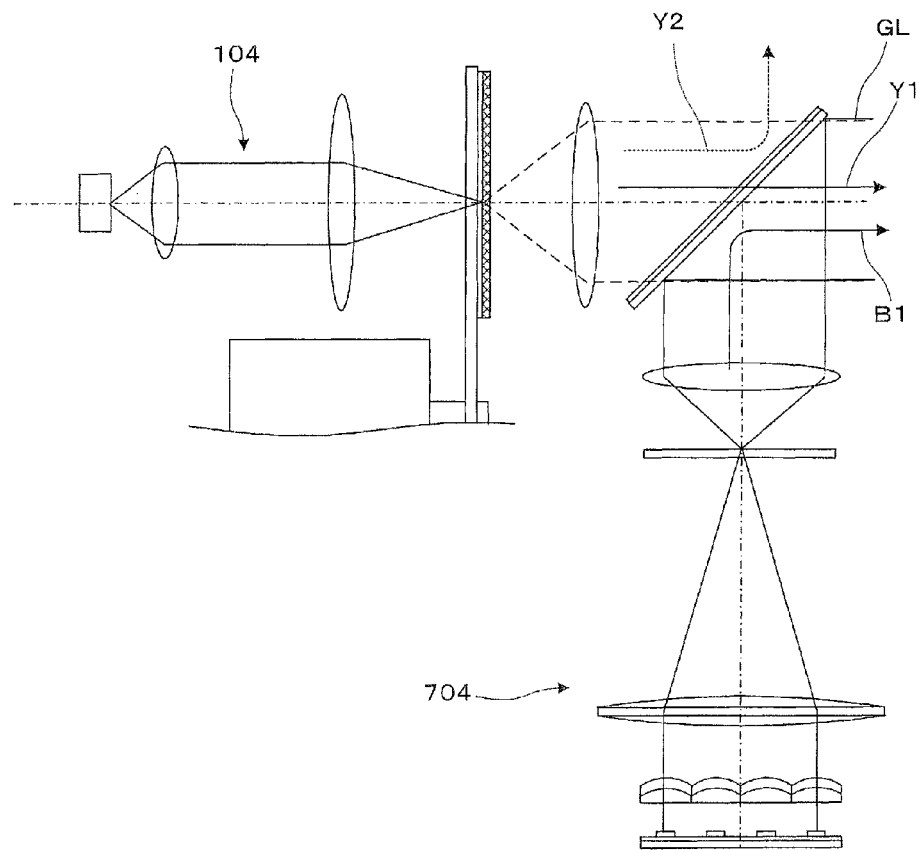
FIG. 9B is a diagram for explaining another example.

It should be noted that as shown in FIG. 9B, by combining the light source device 104 for emitting the yellow light as the useful component Y1 and the light source device 704 for emitting the blue light B1 with each other, the source light GL including the three primary colors can be generated. It should be noted that the structure of the light source device 704 can be made substantially the same as that of, for example, the light source device 702 shown in FIG. 7.

Fifth Embodiment

Figure 10:
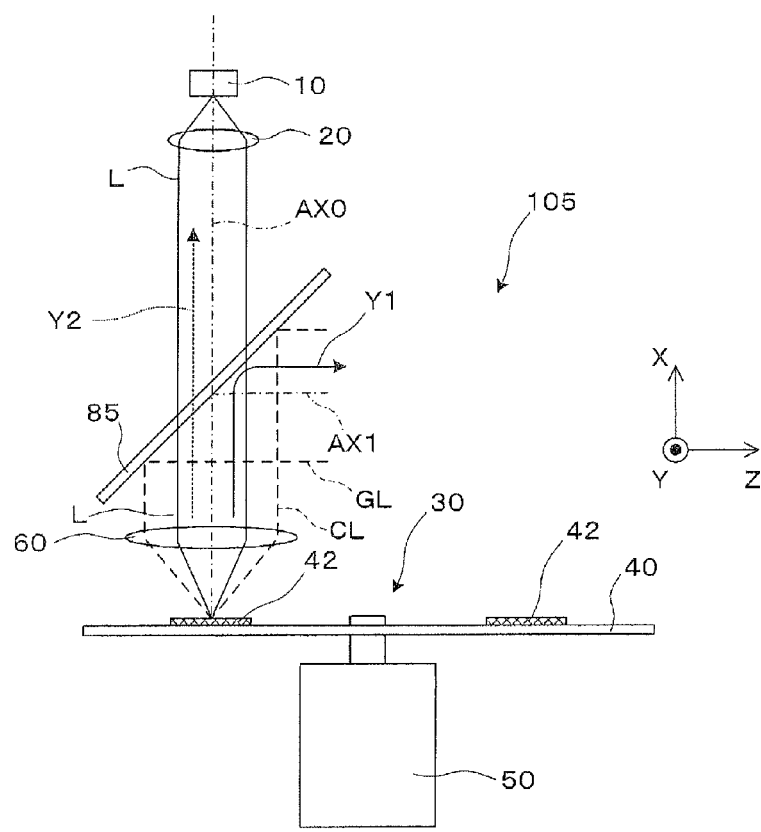
FIG. 10 is a diagram for explaining a light source device according to a fifth embodiment of the invention.

In the first embodiment, the wavelength separation element 80 transmits the useful component Y1 with a high color separation property while reflecting the other, useless component Y2 among the composite light CL to thereby generate the source light GL in which the light intensity of the component in the second wavelength range among the component of the first wavelength range is reduced. In contrast thereto, a wavelength separation element 85 in the present embodiment reflects the useful component Y1 with a high color separation property while transmitting the other, useless component Y2 among the composite light CL to thereby generate the source light GL in which the light intensity of the component in the second wavelength range among the component of the first wavelength range is reduced. The present embodiment will be explained with reference to FIGS. 10 through 12. It should be noted that the explanation of the part overlapping the first embodiment will be omitted.

The light source device 105 is provided with the wavelength separation element 85. The composite light CL, which has been emitted from the phosphor 42 and then transmitted through the pickup lens 60, enters the wavelength separation element 85. The wavelength separation element 85 reflects the useful component Y1 with a high color separation property while transmitting the other, useless component Y2 among the composite light CL to thereby generate the source light GL in which the light intensity of the component in the second wavelength range among the component of the first wavelength range is reduced. Thus, in the case of using the light source device 105 as a part of the light source device in, for example, a projector, high color reproducibility can be obtained.

Figure 11:
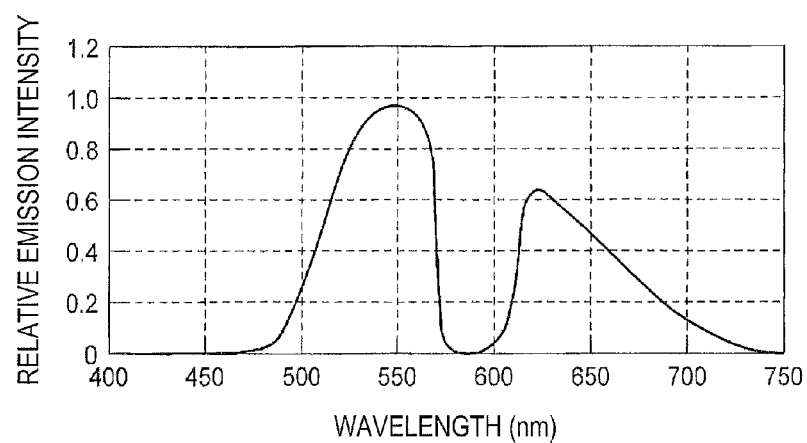
FIG. 11 is a graph showing the emission spectrum of a wavelength separation element.

Preferably, the source light GL does not include the light with the component in the second wavelength range among the component in the first wavelength range. Thus, higher color reproducibility can be obtained. In the present embodiment, the wavelength separation element 85 reflects only the useful component Y1 with a high color separation property among the composite light CL on the one hand, and transmits the other, useless component Y2 in the direction toward the light source to thereby eliminate the useless component Y2 from the composite light CL. The useless component Y2 corresponds to the component in the second wavelength range. According to the light source device 105 of the present embodiment, the yellow light with the wavelength characteristics shown in FIG. 11 is emitted as the source light GL.

Figure 12:
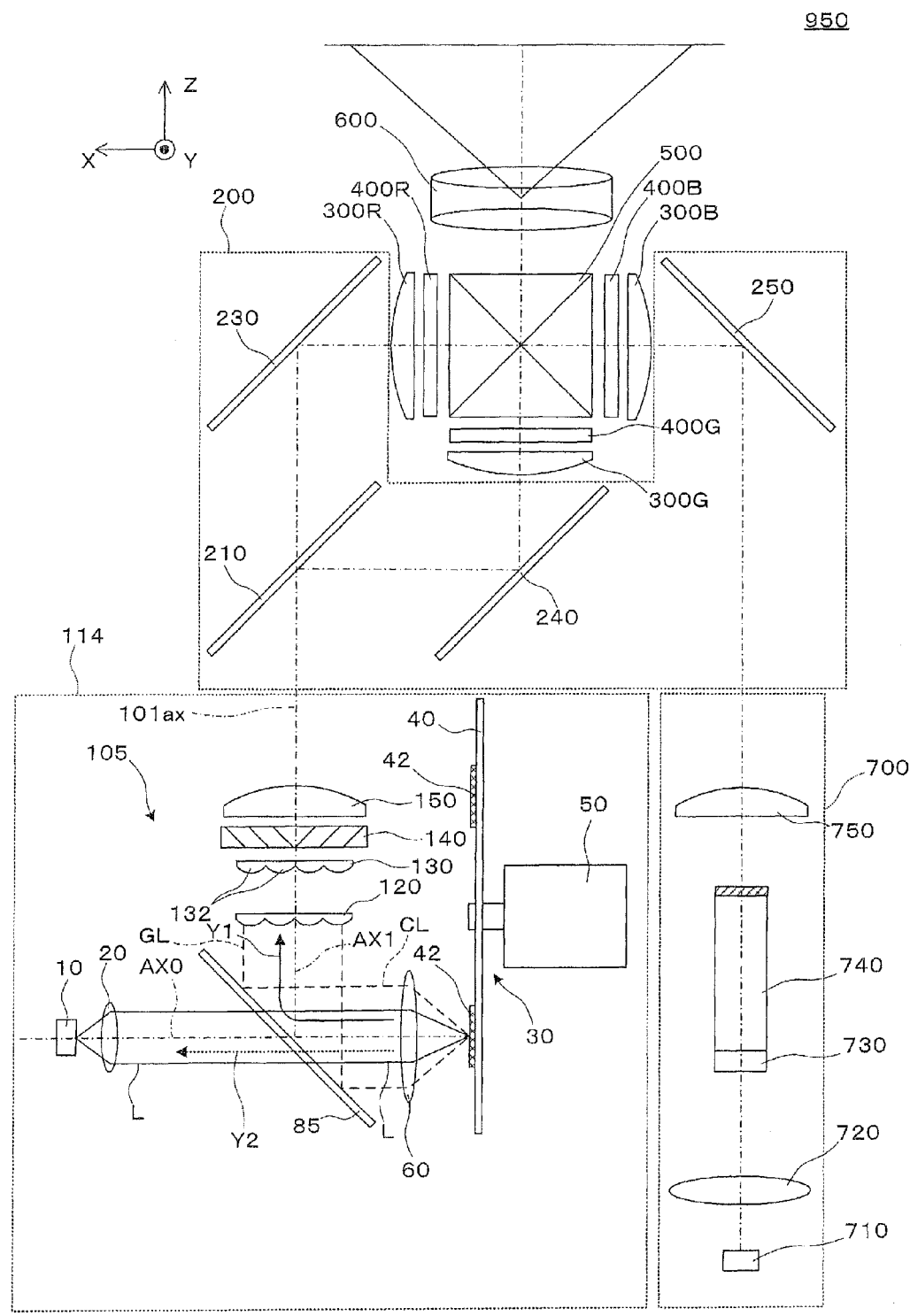
FIG. 12 is a diagram for explaining an example of a projector equipped with the light source device.

FIG. 12 is a diagram showing an example of a projector equipped with the light source device 105. The projector 950 shown in FIG. 12 is provided with two illumination devices, namely a first illumination device 114 including the light source device 105, and the second illumination device 700. The first illumination device 114 generates the illumination light for illuminating the liquid crystal light modulation devices 400R, 400G using the source light GL emitted from the light source device 105. The second illumination device 700 generates the illumination light for illuminating the liquid crystal light modulation device 400B. Thus, the projector 950 can form the image with high image quality.

Other Issues

Although the invention is hereinabove explained along the embodiments, the invention is not limited to the embodiments described above, but can be put into practice in various forms within the scope or the spirit of the invention. The following modifications, for example, are also possible.

In the above description, since the composite light CL includes the component in the wavelength range of the excitation light, which remains without being converted by the phosphor 42, the wavelength range of 430 through 500 nm and the wavelength range of 570 through 600 nm are defined to be the second wavelength range WL2. However, in the case in which the whole of the excitation light input to the phosphor 42 is converted to the fluorescence, and no excitation light is included in the composite light CL, it is also possible to define the wavelength range of 570 through 600 nm as the second wavelength range WL2, and define the wavelength range of 430 through 500 nm as a part of the fourth wavelength range WL4. Such a configuration as described above makes it easy to design the wavelength separation element 80.

Although the example of the phosphor formed on the rotary fluorescent plate, which radiates the red light and the green light using the blue excitation light, is explained, the phosphor is not limited thereto. For example, it is also possible to use violet light or ultraviolet light as the excitation light, and a phosphor for radiating the three colored lights, namely the red light, the green light, and the blue light, using the excitation light. In this case, as the second wavelength range WL2, it is possible to define either one of the wavelength range between the red wavelength range and the green wavelength range, and the wavelength range between the green wavelength range and the blue wavelength range, which causes the color reproducibility to degrade.

As described above, it is possible to set the wavelength range, which causes the color reproducibility to degrade, among the composite light CL to the second wavelength range WL2, and to design the wavelength separation characteristics of the wavelength separation element 80 so as to reduce the light intensity in the second wavelength range WL2 in the source light GL emitted from the light source device. In the source light GL, the lower the light intensity in the second wavelength range WL2 is, the further the color reproducibility can be improved.

Although in the fifth embodiment, the reflective rotary fluorescent plate 30 is used, the invention is not limited to this configuration. The transmissive rotary fluorescent plate 34 described in the fourth embodiment section can also be used.

In the above description, the phosphor 42 is formed on the plate member 40 rotated by the electric motor 50, and the heat of the phosphor 42 generated by the irradiation with the excitation light radiates in the large area disposed along the rotational direction of the plate member 40, and thus, the degradation of the luminous efficiency due to the heating of the phosphor 42 is suppressed. However, in the case in which there is no possibility of the degradation of the luminous efficiency, the phosphor 42 can be installed without disposing the rotating mechanism.

Further, although it is assumed in, for example, FIG. 1B that the plate member 40 is a disk, the plate member 40 is not limited to a disk.

Although the example of the phosphor continuously formed along the rotational direction of the plate member is explained, the configuration of the phosphor is not limited to this example. It is also possible to adopt a configuration in which a plurality of types of phosphors are formed along the rotational direction of the plate member to thereby make it possible to sequentially emit a plurality of colored lights similarly to the rotary fluorescent plate of Document 1. The plurality of colored lights sequentially emitted from the rotary fluorescent plate are modulated by a single light modulation device, and form a color image.

Further, although in the above description, the laser source for emitting the laser beam is used as the light source 10 and so on, the light source can also be other solid-state light sources, or further, a xenon lamp or a mercury lamp.

The entire disclosure of Japanese Patent Application No. 2012-272040, filed Dec. 13, 2012 is expressly incorporated by reference herein.

What is claimed is:

1. A light source device comprising:
   a light source adapted to emit a first light;
   a wavelength conversion element adapted to emit a second light in a first wavelength range due to irradiation of the first light; and
   a wavelength separation element to which the second light is input, the wavelength separation element being composed of a single member,
   wherein the wavelength separation element generates a third light reduced in light intensity of a component in a second wavelength range among a component in the first wavelength range compared to the second light,
   wherein the second wavelength range includes a fifth wavelength range, which is a wavelength range between a third wavelength range on a long wavelength side and a fourth wavelength range on a short wavelength side among the first wavelength range, and
   wherein the third light includes a component in the third wavelength range and a component in the fourth wavelength range, but the component in the filth wavelength range is reduced.

2. The light source device according to claim 1, wherein the third wavelength range is a wavelength range of a red light component, and
   a fourth wavelength range is a wavelength range of a green light component.

3. The light source device according to claim 1, wherein the second wavelength range further includes a sixth wavelength range, which includes a wavelength range of the first light and is located on the short wavelength side of the fourth wavelength range.

4. The light source device according to claim 1, wherein the wavelength separation element generates the third light by reflecting a component of the second light other than the component in the second wavelength range.

5. The light source device according to claim 1, wherein the wavelength separation element generates the third light by transmitting a component of the second light other than the component in the second wavelength range.

6. The light source device according to claim 1, wherein the component in the second wavelength range is excluded from the third light.

7. The light source device according to claim 1, wherein the light source is one of a solid-state light source, a xenon lamp, and a mercury lamp.

8. The light source device according to claim 1, wherein the component in the fifth wavelength range is eliminated.

9. The light source device according to claim 1, wherein the light source device further comprises a second light source adapted to emit a fourth light, and the wavelength separation element combines the third light with the fourth light.

10. The light source device according to claim 3, wherein among the second wavelength range,
    the fifth wavelength range is 570 nm through 600 nm, and
    the sixth wavelength range is 430 nm through 500 nm.

11. The light source device according to claim 5, wherein the wavelength separation element reflects the first light, which is emitted by the light source, toward the wavelength conversion element, and reflects the component in the second wavelength range among the second light toward the light source.

12. The light source device according to claim 5, wherein the wavelength separation element reflects the first light, which is emitted by the light source, toward the wavelength conversion element, and reflects the component in the fifth wavelength range among the second light toward the light source.

13. A projector comprising:
    the light source device according to claim 1;
    a light modulation device adapted to modulate the light from the light source device in accordance with image information; and
    a projection optical system adapted to project the modulated light from the light modulation device as a projection image.

14. A projector comprising:
    the light source device according to claim 2;
    a light modulation device adapted to modulate the light from the light source device in accordance with image information; and
    a projection optical system adapted to project the modulated light from the light modulation device as a projection image.

15. A projector comprising:
    the light source device according to claim 3;
    a light modulation device adapted to modulate the light from the light source device in accordance with image information; and
    a projection optical system adapted to project the modulated light from the light modulation device as a projection image.

16. A projector comprising:
    the light source device according to claim 4;
    a light modulation device adapted to modulate the light from the light source device in accordance with image information; and
    a projection optical system adapted to project the modulated light from the light modulation device as a projection image.

17. A projector comprising:
    the light source device according to claim 5;
    a light modulation device adapted to modulate the light from the light source device in accordance with image information; and a projection optical system adapted to project the modulated light from the light modulation device as a projection image.

18. A projector comprising:

the light source device according to claim 11;

a light modulation device adapted to modulate the light from the light source device in accordance with image information; and a projection optical system adapted to project the modulated light from the light modulation device as a projection image.

19. A projector comprising:

the light source device according to claim 6;

a light modulation device adapted to modulate the light from the light source device in accordance with image information; and a projection optical system adapted to project the modulated light from the light modulation device as a projection image.

20. A projector comprising:

the light source device according to claim 10;

a light modulation device adapted to modulate the light from the light source device in accordance with image information; and a projection optical system adapted to project the modulated light from the light modulation device as a projection image.

21. A projector comprising:

the light source device according to claim 7;

a light modulation device adapted to modulate the light from the light source device in accordance with image information; and a projection optical system adapted to project the modulated light from the light modulation device as a projection image.

* * * * *